US012412503B2

(12) United States Patent
Park

(10) Patent No.: US 12,412,503 B2
(45) Date of Patent: Sep. 9, 2025

(54) DISPLAY DEVICE AND METHOD OF COMPENSATING DATA FOR THE SAME

(71) Applicant: Samsung Display Co., Ltd., Yongin-si (KR)

(72) Inventor: Se Hyuk Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 112 days.

(21) Appl. No.: 17/886,458

(22) Filed: Aug. 12, 2022

(65) Prior Publication Data

US 2023/0162647 A1 May 25, 2023

(30) Foreign Application Priority Data

Nov. 24, 2021 (KR) ........................ 10-2021-0163454

(51) Int. Cl.
*G09G 3/20* (2006.01)
*G09G 3/3258* (2016.01)

(52) U.S. Cl.
CPC ......... *G09G 3/2074* (2013.01); *G09G 3/2003* (2013.01); *G09G 3/3258* (2013.01); *G09G 2360/16* (2013.01)

(58) Field of Classification Search
CPC ............. G09G 2360/16; G09G 3/2074; G09G 3/2003; G09G 3/3258; G09G 3/3275; G09G 2300/0426; G09G 2300/0452; G09G 2300/0819; G09G 2300/0842; G09G 2300/0861; G09G 3/3233; G09G 3/3225; G09G 3/36; G09G 2300/0439; G09G 2310/0264; G09G 2320/0233; G09G 2330/021; G09G 5/06
See application file for complete search history.

(56) References Cited

U.S. PATENT DOCUMENTS 4,959,718 A * 9/1990 Bennett ................ H04N 5/0736 348/518
5,764,238 A * 6/1998 Lum ..................... G06T 3/4007 345/660

(Continued)

FOREIGN PATENT DOCUMENTS

CN 112864211 A * 5/2021 ........... H10K 50/813
JP 3636192 4/2005

(Continued)

*Primary Examiner* — Ricardo Osorio
(74) *Attorney, Agent, or Firm* — CANTOR COLBURN LLP

(57) ABSTRACT

A display device includes a data compensator to generate output image data by adding an extension bit to input image data received from an external processor, a data driver to supply a data voltage corresponding to the output image data to each of data lines, and a pixel unit including a plurality of sub-pixels. A first data line for providing a first color data signal is connected to a first sub-pixel disposed in an odd-numbered pixel row through a first anode, and is connected to a second sub-pixel disposed in an even-numbered pixel row through a second anode having a different size than the first anode, and the data compensator is configured to add a first extension bit to the input image data corresponding to the first sub-pixel and add a second extension bit to the input image data corresponding to the second sub-pixel.

22 Claims, 11 Drawing Sheets

| GRAYSCALE (GR) | EVEN - ODD CURRENT DIFFERENCE [A] | |
|---|---|---|
| | ΔI_R | ΔI_B |
| 255 | 1.80E-10 | 1.19E-10 |
| 127 | 4.60E-11 | 4.50E-11 |
| 87 | 2.18E-11 | 2.33E-11 |
| 31 | 2.14E-12 | 2.80E-12 |
| 11 | 4.55E-13 | 3.80E-13 |

(56) References Cited

U.S. PATENT DOCUMENTS

| | | | | | |
|---|---|---|---|---|---|
| 5,838,296 | A * | 11/1998 | Butler | G06T 3/4023 345/24 |
| 5,894,300 | A * | 4/1999 | Takizawa | H04N 9/641 345/545 |
| 5,914,725 | A * | 6/1999 | MacInnis | G06T 3/4007 345/441 |
| 6,023,302 | A * | 2/2000 | MacInnis | H04N 9/75 348/592 |
| 6,232,955 | B1 * | 5/2001 | Guttag | G09G 5/06 345/601 |
| 6,263,396 | B1 * | 7/2001 | Cottle | H04N 21/42653 348/E5.005 |
| 6,614,498 | B1 | 9/2003 | Tanaka et al. | |
| 6,975,324 | B1 * | 12/2005 | Valmiki | H04N 5/44504 348/568 |
| 10,210,804 | B2 | 2/2019 | Kim et al. | |
| 10,410,578 | B2 | 9/2019 | Song et al. | |
| 10,644,077 | B1 * | 5/2020 | Choi | H10D 86/60 |
| 10,699,636 | B2 * | 6/2020 | You | G02F 1/136286 |
| 11,594,187 | B2 | 2/2023 | Pyo et al. | |
| 2005/0270885 | A1 * | 12/2005 | Masuo | G11C 8/16 365/230.05 |
| 2007/0076967 | A1 * | 4/2007 | Kim | H04N 19/107 382/239 |
| 2008/0158033 | A1 * | 7/2008 | Doi | G09G 3/3685 341/154 |
| 2009/0128584 | A1 * | 5/2009 | Lee | G09G 3/2055 345/87 |
| 2011/0037760 | A1 * | 2/2011 | Kim | G09G 3/3614 345/96 |
| 2012/0081410 | A1 | 4/2012 | Yeo et al. | |
| 2013/0141455 | A1 * | 6/2013 | Wang | G09G 5/026 345/596 |
| 2015/0312499 | A1 * | 10/2015 | Panicacci | H04N 25/75 348/251 |
| 2017/0018219 | A1 * | 1/2017 | Wang | G09G 3/2092 |
| 2018/0146148 | A1 * | 5/2018 | Kaneko | H04N 25/78 |
| 2021/0241808 | A1 * | 8/2021 | Nagata | G11C 8/08 |
| 2023/0057334 | A1 * | 2/2023 | Yang | H10K 59/352 |

FOREIGN PATENT DOCUMENTS

| | | | | |
|---|---|---|---|---|
| KR | 20090126506 | A * | 12/2009 | |
| KR | 10-2012-0033622 | | 4/2012 | |
| KR | 10-2016-0092530 | | 8/2016 | |
| KR | 10-2018-0072303 | | 6/2018 | |
| KR | 10-2020-0001771 | | 1/2020 | |
| KR | 20210134162 | A | 11/2021 | |
| WO | WO-2019130731 | A1 * | 7/2019 | H04N 25/134 |
| WO | WO-2020088021 | A1 * | 5/2020 | G09G 3/20 |

* cited by examiner

AE: AE11, AE12, AE21, AE22, AE3
CNT: CNT11, CNT12, CNT21, CNT22, CNT3
EL: EL_R, EL_G, EL_B

FIG. 7A

| | EVEN PIXEL CAPACITANCE (EVEN - ODD DIFFERENCE) | |
|---|---|---|
| | Red | Blue |
| Anode Capacitance [fF] | 69.27 (+2.36) | 65.14 (+2.35) |

FIG. 7B

| GRAYSCALE (GR) | EVEN - ODD CURRENT DIFFERENCE [A] | |
|---|---|---|
| | ΔI_R | ΔI_B |
| 255 | 1.80E-10 | 1.19E-10 |
| 127 | 4.60E-11 | 4.50E-11 |
| 87 | 2.18E-11 | 2.33E-11 |
| 31 | 2.14E-12 | 2.80E-12 |
| 11 | 4.55E-13 | 3.80E-13 |

| Name | Function | Defualt | Description |
|---|---|---|---|
| APC | Anode Path Condition | H | H : Anode Short Path - Odd Line<br>Anode Long Path - Even Line<br>L : Anode Short Path - Even Line<br>Anode Long Path - Odd Line |

FIG. 10A

| GRAYSCALE (GR) | ΔI(@1GR) [A] | | (Even – Odd) ΔI [A] | | CHANGE AMOUNT COMPARED TO ΔI(@1GR) (%) | |
|---|---|---|---|---|---|---|
| | Red | Blue | Red | Blue | Red | Blue |
| 255 | 5.00E-10 | 7.70E-10 | 1.80E-10 | 1.20E-10 | 35.4 | 15.4 |
| 87 | 1.20E-10 | 2.40E-10 | 2.20E-11 | 2.30E-11 | 18.3 | 9.8 |
| 11 | 9.50E-12 | 2.10E-11 | 4.60E-13 | 3.80E-13 | 4.8 | 1.8 |

FIG. 10B

| LUT | | |
|---|---|---|
| GRAYSCALE (GR) | Red | Blue |
| 255 | 01 | 00 |
| 254 | 01 | 00 |
| ⋮ | ⋮ | ⋮ |
| 87 | 00 | 00 |
| 86 | 00 | 00 |
| ⋮ | ⋮ | ⋮ |
| 11 | 00 | 00 |
| 10 | 00 | 00 |
| ⋮ | ⋮ | ⋮ |
| 1 | 00 | 00 |
| 0 | 00 | 00 |

DISPLAY DEVICE AND METHOD OF COMPENSATING DATA FOR THE SAME

This application claims priority from and the benefit of Korean Patent Application No. 10-2021-0163454, filed on Nov. 24, 2021, which is hereby incorporated by reference for all purposes as if fully set forth herein.

BACKGROUND

Field

Embodiments of the invention relate generally to display devices, and more particular to display devices capable of compensating image data and methods of compensating image data used to drive the pixels of display devices.

Discussion of the Background

As information technology is developed, the importance of display devices, which are a connection medium between a user and information, has been increasing. In response to this, a usage of a display device such as a liquid crystal display device and an organic light emitting display device is increasing.

The display device may have various pixel structures by disposing sub-pixels configured to emit red light, green light, and blue light in various shapes and arrangements. Among the various pixel structures, a PENTILE™ pixel structure in which sub-pixels are arranged in a diamond shape is known to have excellent perceived image quality.

The PENTILE™ pixel structure may have a structure in which sub-pixels for emitting red and blue light are alternately connected to the same data line along the longitudinal direction of the data line and sub-pixels for emitting green light are successively connected to the same data line along the extension direction of the data line.

The data line to which the sub-pixels for emitting green light are connected may supply only a green data signal for each one horizontal period, and the data line to which the sub-pixels for emitting red and blue light are connected may supply a red data signal and a blue data signal of different voltage levels for each one horizontal period.

The above information disclosed in this Background section is only for understanding of the background of the inventive concepts, and, therefore, it may contain information that does not constitute prior art.

SUMMARY

In studying display devices having a PENTILE™ pixel structure in which only sub-pixels of one color are connected to one data line, Applicant realized that an increase in power consumption and non-uniform luminance may occur in such display devices. Since voltages of different levels are supplied to the data line to which the sub-pixels for emitting light in different colors are connected for each one horizontal period, the peak current may increase whenever the voltage level of the data signal is changed.

Display devices and methods of compensating data for driving the pixels of the display devices according to the principles and illustrative embodiments of the invention are capable of reducing or preventing a difference between a luminance of an even-numbered pixel row and an odd-numbered pixel row while supplying only a data signal of one color to one data line in a PENTILE™ pixel structure.

For example, display devices constructed according to the principles and illustrative embodiments of the invention may reduce or prevent a difference between a luminance of an even-numbered pixel row and a luminance of an odd-numbered pixel row, by compensating for a current deviation due to the difference in length of an anode of a light emitting element while supplying only a data signal of one color to one data line in a PENTILE™ pixel structure.

Additional features of the inventive concepts will be set forth in the description which follows, and in part will be apparent from the description, or may be learned by practice of the inventive concepts.

According to one aspect of the invention, a display device includes a data compensator to generate output image data by adding an extension bit to input image data received from an external processor, a data driver to supply a data voltage corresponding to the output image data to each of data lines, and a pixel unit including a plurality of sub-pixels. A first data line for providing a first color data signal is connected to a first sub-pixel disposed in an odd-numbered pixel row through a first anode, and is connected to a second sub-pixel disposed in an even-numbered pixel row through a second anode having a different size from the first anode, and the data compensator is configured to add a first extension bit to the input image data corresponding to the first sub-pixel and add a second extension bit to the input image data corresponding to the second sub-pixel.

The extension bit may be 2 bits, the first extension bit may be '00', and the second extension bit may be set to any one of '00', '01', '10', and '11' based on a lookup table set according to each grayscale level and each emission color of the sub-pixels.

The data voltage may have a magnitude that increases as the second extension bit increases in an order of '00', '01', '10', and '11'.

The second extension bit may be determined based on a ratio of a difference in value between a driving current of the first sub-pixel and a driving current of the second sub-pixel to a magnitude of a driving current that changes 1 grayscale value at each grayscale level.

When the difference in value between the driving current of the first sub-pixel and the driving current of the second sub-pixel to the magnitude of the driving current that changes 1 grayscale value has a range of about 0 to about 25%, the second extension bit may be set to '00', when the ratio of the difference in value between the driving current of the first sub-pixel and the driving current of the second sub-pixel to the magnitude of the driving current that changes 1 grayscale value has a range of about 26 to about 50%, the second extension bit may be set to '01', when the ratio of the difference in value between the driving current of the first sub-pixel and the driving current of the second sub-pixel to the magnitude of the driving current that changes 1 grayscale value has a range of about 51 to about 75%, the second extension bit may be set to '10', and when the ratio of the difference in value between the driving current of the first sub-pixel and the driving current of the second sub-pixel to the magnitude of the driving current that changes 1 grayscale value has a range of about 76 to about 100%, the second extension bit may be set to '11'.

The data compensator may further include a data position determiner to determine whether the input image data corresponds to the first sub-pixel or the second sub-pixel.

The data position determiner may be configured to determine whether a length of the first anode is shorter or longer than and a length of the second anode based on an anode path register value.

The anode path register value may be 1 bit, and the data position determiner may be configured to set the length of the first anode to be shorter than the length of the second anode when the anode path register value is '1', and to determine that the length of the first anode is longer than the length of the second anode when the anode path register value is '0'.

The length from one end to another end of the first anode may be shorter than the length from one end to another end of the second anode.

The area of the first anode may be less than the area of the second anode.

A second data line for providing a second color data signal may be connected to a third sub-pixel disposed in the odd-numbered pixel row through a third anode, and may be connected a fourth sub-pixel disposed in the even-numbered pixel row through a fourth anode having a substantially same size as the third anode.

The first color data signal may be for a red or blue image, and the second color data signal may be for a green image.

The first sub-pixel and the second sub-pixel may be disposed in different pixel rows and different pixel columns, and the third sub-pixel and the fourth sub-pixel may be disposed in different pixel rows and a same pixel row.

The data driver may include a plurality of source channels, and each of the plurality of source channels may be configured to provide a data voltage of one color to a corresponding data line.

Each of the sub-pixels may include a light emitting element and a pixel circuit, and the pixel circuit may include a first transistor including a first electrode connected to a second node connected to a first driving power line and a second electrode connected to a third node, a second transistor including a first electrode connected to a corresponding data line and a second electrode connected to the second node, a third transistor including a first electrode connected to a first electrode of the light emitting element and a second electrode connected to a power line for supplying an initialization voltage, a fourth transistor including a second electrode connected to the power line and a first node connected to a gate electrode of the first transistor, a fifth transistor including a first electrode connected to the first driving power line and a second electrode connected to the second node, a sixth transistor connected between the third node and the light emitting element, and a seventh transistor including a first electrode connected to the first node and a second electrode connected to the third node.

The pixel circuit may further include a storage capacitor disposed between the first driving power line and the first node.

The first sub-pixel may be connected to the sixth transistor through the first anode, and the second sub-pixel may be connected to the sixth transistor through the second anode.

The light emitting element may include an emission layer, the emission layer of the first sub-pixel may overlap at least a portion of the pixel circuit of the first sub-pixel in a thickness direction, and the emission layer of the second sub-pixel may not overlap the pixel circuit of the first sub-pixel in the thickness direction.

According to another aspect of the invention, a method of compensating data for a display device, in which a first data line providing a first color data voltage is connected to a first sub-pixel disposed in an odd-numbered pixel row through a first anode and is connected a second sub-pixel disposed in an even-numbered pixel row through a second anode having a different size from the first anode, includes receiving input image data from an external processor, determining whether the input image data corresponds to the first sub-pixel or the second sub-pixel, and generating output image data by adding a first extension bit to the input image data corresponding to the first sub-pixel and adding a second extension bit to the input image data corresponding to the second sub-pixel.

Each of the first and second extension bits may be bits, the first extension bit may be '00', and the second extension bit may be set to any one of '00', '01', '10', and '11' based on a lookup table set according to each grayscale level and each emission color of each of the first and second sub-pixels.

The first color data voltage may have a voltage magnitude that increases as the second extension bit increases in an order of '00', '01', '10', and '11'.

The second extension bit may be determined based on a ration of a difference in value between a driving current of the first sub-pixel and a driving current of the second sub-pixel to a magnitude of a driving current that changes 1 grayscale value at each grayscale level.

When the ratio of the difference in value between the driving current of the first sub-pixel and the driving current of the second sub-pixel to the magnitude of the driving current that changes 1 grayscale value has a range of about 0 to about 25%, the second extension bit may be set to '00' when the ratio of the difference in value between the driving current of the first sub-pixel and the driving current of the second sub-pixel to the magnitude of the driving current that changes 1 grayscale value has a range of about 26 to about 50%, the second extension bit may be set to '01', when the ratio of the difference in value between the driving current of the first sub-pixel and the driving current of the second sub-pixel to the magnitude of the driving current that changes 1 grayscale value has a range of about 51 to about 75%, the second extension bit may be set to '10', and when the ratio of the difference in value between the driving current of the first sub-pixel and the driving current of the second sub-pixel to the magnitude of the driving current that changes 1 grayscale value has a range of about 76 to about 100%, the second extension bit may be set to '11'.

The step of determining whether the input image data corresponds to the first sub-pixel or the second sub-pixel may include determining whether a length between a length of the first anode is shorter or longer than a length of the second anode based on an anode path register value.

The anode path register value may be 1 bit, and the length of the first anode may be set to be shorter than the length of the second anode when the anode path register value is '1', and the length of the first anode may be set to be longer than the length of the second anode when the anode path register value is '0'.

The length from one end to another end of the first anode may be shorter than a length from one end to another end of the second anode.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 7A is a table showing a difference between anode capacitances of a sub-pixel of an odd-numbered pixel row and a sub-pixel of an even-numbered pixel row receiving a red or blue data signal.

FIG. 7B is a table showing deviation of a driving current at each grayscale level between the sub-pixel of the odd-numbered pixel row and the sub-pixel of the even-numbered pixel row receiving the red or blue data signal.

FIG. 10A is a table for describing the data extension unit of FIG. 8.

FIG. 10B is an embodiment of a lookup table stored in a memory of FIG. 8.

DETAILED DESCRIPTION

Figure 1:
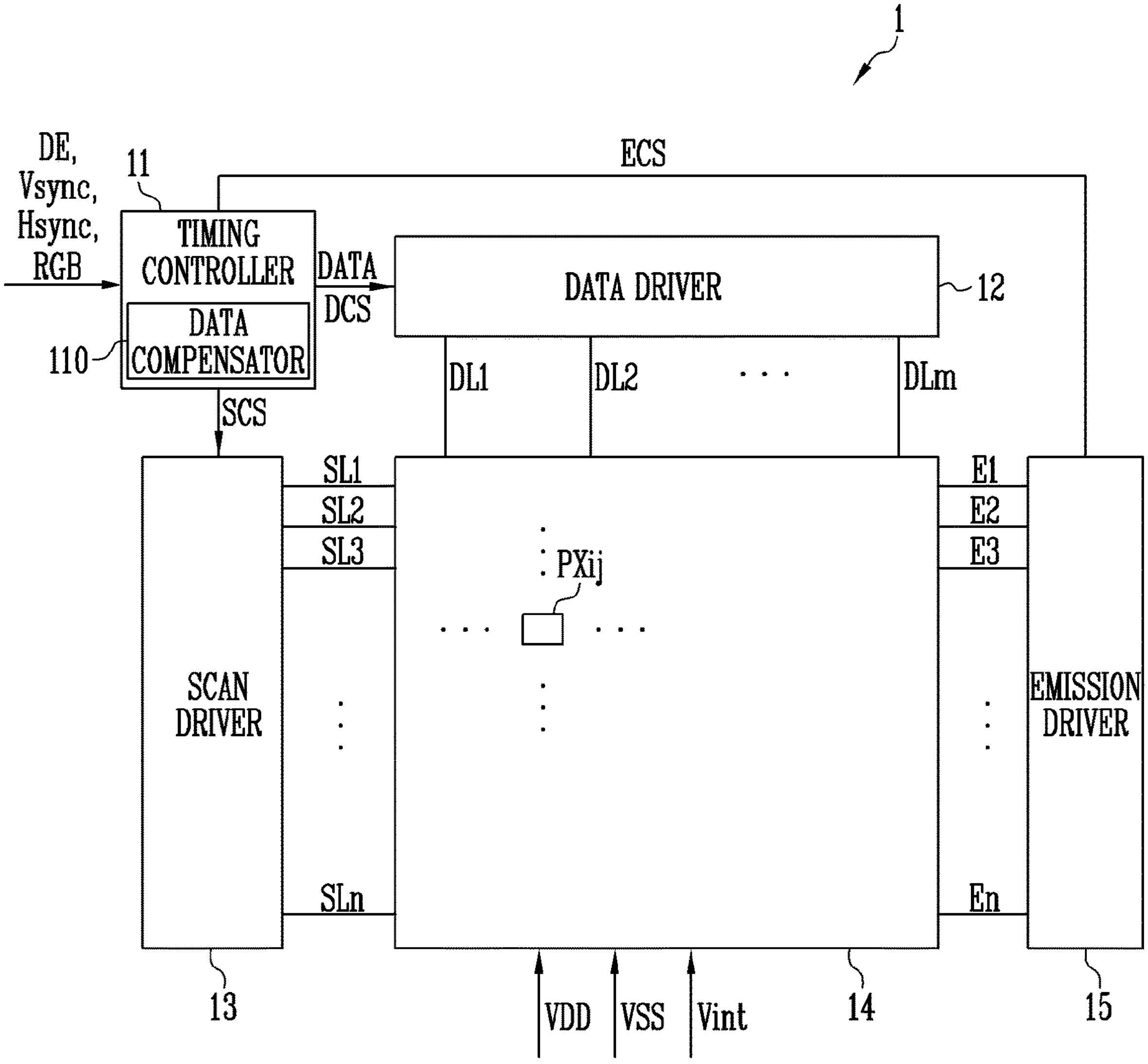
FIG. 1 is a diagram of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a diagram of an embodiment of a display device constructed according to the principles of the invention.

Referring to FIG. 1, the display device 1 may include a timing controller 11, a data driver 12, a scan driver 13, a pixel unit 14, and an emission driver 15.

The timing controller 11 may receive an external input signal from an external processor. The external input signal may include a vertical synchronization signal Vsync, a horizontal synchronization signal Hsync, a data enable signal DE, input image data RGB, and the like.

The vertical synchronization signal Vsync may include a plurality of pulses, and may indicate that a previous frame period is ended and a current frame period is started based on a time point at which each of pulses is generated. In the vertical synchronization signal Vsync, an interval between adjacent pulses may correspond to one frame period. The horizontal synchronization signal Hysnc may include a plurality of pulses, and may indicate that a previous horizontal period is ended and a new horizontal period is started based on a time point at which each of pulses is generated. The data enable signal DE may indicate that the input image data RGB is supplied in a horizontal period. The input image data RGB may be supplied in a pixel row unit in horizontal periods in response to the data enable signal. The input image data RGB corresponding to one frame may be referred to as one input image.

The timing controller 11 may generate a first driving control signal SCS, a second driving control signal DCS, and a third driving control signal ECS in response to synchronization signals supplied from the outside. The first driving control signal SCS may be supplied to the scan driver 13, the second driving control signal DCS may be supplied to the data driver 12, and the third driving control signal ECS may be supplied to the emission driver 15.

The first driving control signal SCS may include a scan start pulse and clock signals. The scan start pulse may control a first timing of a scan signal output from the scan driver 13. The clock signals may be used to shift the scan start pulse.

The second driving control signal DCS may include a source start pulse and clock signals. The source start pulse may control a sampling start time point of data. The clock signals may be used to control a sampling operation.

The third driving control signal ECS may include an emission control start pulse and clock signals. The emission control start pulse may control a first timing of an emission control signal output from the emission driver 15. The clock signals may be used to shift the emission control start pulse.

The timing controller 11 according to an embodiment may include a data compensator 110 that receives the input image data RGB received from the external processor, determines whether the input image data RGB corresponds to data corresponding to an even-numbered pixel row or an odd-numbered pixel row, and adds an extension bit for each pixel row to generate compensated output image data DATA. For example, sub-pixels PXij of the even-numbered pixel row and sub-pixels PXij of the odd-numbered pixel row connected to the same data lines DL1 to DLm may be disposed in different pixel columns, where i and j are integers greater than 1. Thus, anode lengths of the sub-pixels PXij of the even-numbered pixel row and anode lengths of the sub-pixels PXij of the odd-numbered pixel row may be different from each other. The differences of the anode lengths of the sub-pixels PXij may cause differences of anode capacitances. As a result, differences of driving currents flowing through the sub-pixels PXij may occur. Thus, Applicant realized that a data compensation method for compensating for a luminance difference due to the differences of the driving currents may be required. The data compensator 110 for performing data compensation is described in detail later with reference to FIGS. 8, 9, 10A, and 10B.

The data driver 12 may receive a control signal and output image data DATA from the timing controller 11. The data driver 12 may convert the digital output image data DATA into an analog data signal (e.g., data voltage).

The data driver 12 may supply a data signal to the data lines DL1 to DLm in response to the control signal. The data signal supplied to the data lines DL1 to DLm may be supplied to be synchronized with the scan signal supplied to scan lines SL1 to SLn.

The scan driver 13 may receive a clock signal, a scan start signal, and the like from the timing controller 11 and generate scan signals to be provided to the scan lines SL1 to SLn. The scan signals may be set to a gate-on voltage (for example, a low voltage) corresponding to a type of a transistor to which corresponding scan signals are supplied. The transistor, which receives the scan signal, may be set to a turn-on state when the scan signal is supplied. For example, the gate-on voltage of the scan signal supplied to the P-channel metal oxide semiconductor (PMOS) transistor may be a logic low level, and the gate-on voltage of the scan signal supplied to an N-channel metal oxide semiconductor (NMOS) transistor may be a logic high level. Hereinafter, the meaning of "a scan signal is supplied" may be understood to mean that the scan signal is supplied at a logic level that turns on a transistor controlled by the scan signal.

The pixel unit 14 may include the scan lines SL1 to SLn, emission control lines E1 to En, and the data lines DL1 to DLm, and may include the sub-pixels PXij connected to the scan lines SL1 to SLn, emission control lines E1 to En, and the data lines DL1 to DLm (where m and n are integers greater than 1). Each of the sub-pixels PXij may include a driving transistor and a plurality of switching transistors. The sub-pixels PXij may receive first driving power VDD, second driving power VSS, and an initialization voltage Vint from a power supply. A voltage level of the second driving power VSS may be lower than a voltage level of the first driving power VDD. For example, a voltage of the first driving power VDD may be a positive voltage, and a voltage of the second driving power VSS may be a negative voltage.

The emission driver 15 may receive a clock signal, an emission stop signal, and the like from the timing controller 11 and generate the emission control signals to be provided to the emission control lines E1 to En. The emission control signal may be sequentially supplied to the emission control lines E1 to En.

The emission control signal may be set to a gate-off voltage (for example, a high voltage). A transistor receiving the emission control signal may be turned off when the emission control signal is supplied, and may be set to a turn-on state in other cases. Hereinafter, the meaning of "the emission control signal is supplied" may be understood to mean that the emission control signal is supplied at a logic level that turns off a transistor controlled by the emission control signal.

In FIG. 1, for convenience of description, each of the scan driver 13 and the emission driver 15 is shown as a single configuration, but embodiments are not limited thereto. For example, at least a portion of the scan driver 13 and the emission driver 15 may be integrated into one driving circuit, module, or the like.

Figure 2:
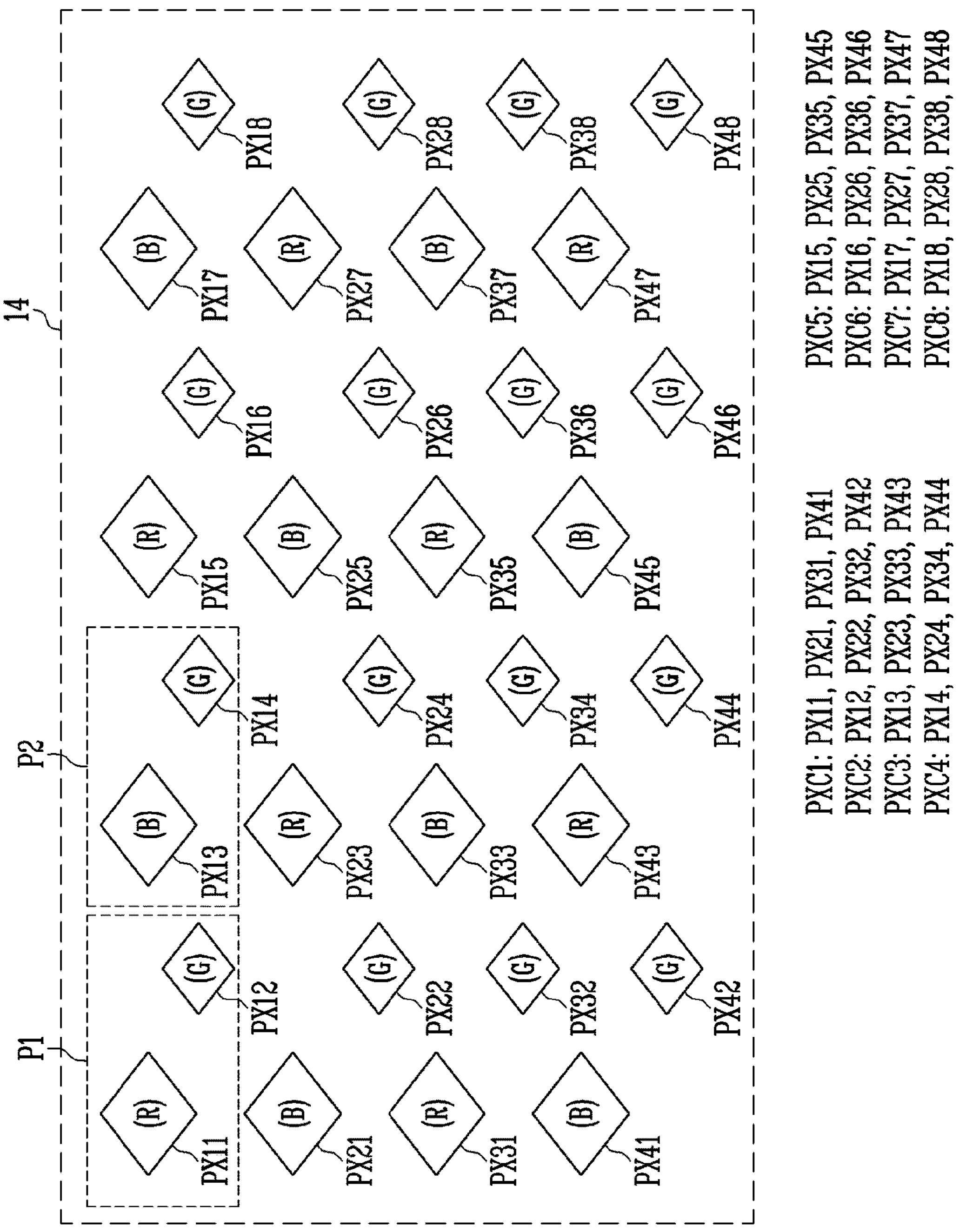
FIG. 2 is a diagram of an example of a pixel unit included in the display device of FIG. 1.

FIG. 2 is a diagram of an example of the pixel unit included in the display device of FIG. 1.

Referring to FIGS. 1 and 2, the pixel unit 14 of a PENTILE™ structure is illustrated as an example. The PENTILE™ structure according to an embodiment may have a structure in which a first pixel P1 having sub-pixels PX11 and PX12 for emitting red light R and green light G and a second pixel P2 having sub-pixels PX13 and PX14 for emitting blue light B and green light G are alternately arranged in a horizontal direction and a vertical direction. In other words, the PENTILE™ structure may have a structure in which the sub-pixels PXij for emitting red light R and blue light B are alternately disposed along the longitudinal direction of the data lines DL1 to DLm and the sub-pixels PXij for emitting green light G are successively arranged along the extension direction of the data lines DL1 to DLm.

The pixel unit 14 may include a first pixel column PXC1, a second pixel column PXC2, a third pixel column PXC3, a fourth pixel column PXC4, a fifth pixel column PXC5, a sixth pixel column PXC6, a seventh pixel column PXC7, and an eighth pixel column PXC8. Although the first to eighth pixel columns PXC1, PXC2, PXC3, PXC4, PXC5, PXC6, PXC7, and PXC8 are shown in FIG. 2, embodiments are not limited thereto, and the pixel unit 14 may include more pixel columns.

In the first pixel column PXC1, the sub-pixels PXij for emitting red light R and blue light B may be alternately disposed along the extension direction of the data lines DL1 to DLm. The first pixel column PXC1 may include a first-first sub-pixel PX11, a second-first sub-pixel PX21, a third-first sub-pixel PX31, and a fourth-first sub-pixel PX41.

In the second pixel column PXC2, the sub-pixels PXij for emitting green light G may be successively disposed along the extension direction of the data lines DL1 to DLm. The second pixel column PXC2 may include a first-second sub-pixel PX12, a second-second sub-pixel PX22, a third-second sub-pixel PX32, and a fourth-second sub-pixel PX42.

In the third pixel column PXC3, the sub-pixels PXij for emitting blue light B and red light R may be alternately disposed along the extension direction of the data lines DL1 to DLm. The third pixel column PXC3 may include a first-third sub-pixel PX13, a second-third sub-pixel PX23, a third-third sub-pixel PX33, and a fourth-third sub-pixel PX43. For example, when the sub-pixel PX13 (or B) is disposed in a first row of the third pixel column PXC3, the sub-pixel PX11 (or R) may be disposed in a first row of the first pixel column PXC1.

In the fourth pixel column PXC4, the sub-pixels PXij for emitting green light G may be successively disposed along the extension direction of the data lines DL1 to DLm. The fourth pixel column PXC4 may include a first-fourth sub-pixel PX14, a second-fourth sub-pixel PX24, a third-fourth sub-pixel PX34, and a fourth-fourth sub-pixel PX44.

The fifth pixel column PXC5 may include a first-fifth sub-pixel PX15, a second-fifth sub-pixel PX25, a third-fifth sub-pixel PX35, and a fourth-fifth sub-pixel PX45. The seventh pixel column PXC7 may include a first-seventh sub-pixel PX17, a second-seventh sub-pixel PX27, a thirty-seventh sub-pixel PX37, and a fourth-seventh sub-pixel PX47. In the fifth pixel column PXC5, the sub-pixels PX15 and PX35 for emitting red light R and the sub-pixels PX25 and PX45 for emitting blue light B are alternately disposed identically to the first pixel column PXC1, and in the seventh pixel column PXC7, the sub-pixels PX17 and PX37 for emitting light in blue light B and the sub-pixels PX27 and PX37 for emitting red light R may be alternately disposed identically to the third pixel column PXC3.

The sixth pixel column PXC6 may include a first-sixth sub-pixel PX16, a second-sixth sub-pixel PX26, a third-sixth sub-pixel PX36, and a fourth-sixth sub-pixel PX46. The eighth pixel column PXC8 may include a first-eighth sub-pixel PX18, a second-eighth sub-pixel PX28, a third-eighth sub-pixel PX38, and a fourth-eighth sub-pixel PX48. For example, in the sixth pixel column PXC6 and the eighth pixel column PXC8, a plurality of sub-pixels PX16, PX26, PX36, PX46, PX18, PX28, PX38, and PX48 for emitting light in green G may be disposed identically to the second pixel column PXC2 and the fourth pixel column PXC4.

Figure 3:
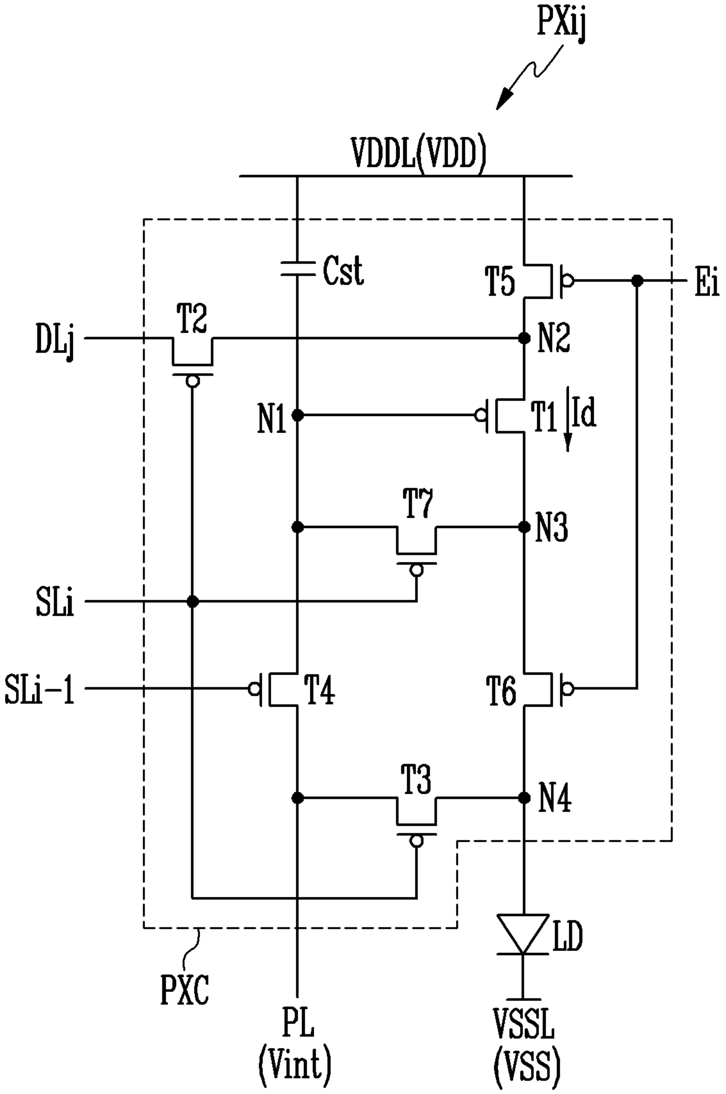
FIG. 3 is a diagram of an example of a representative sub-pixel included in the display device of FIG. 1.

FIG. 3 is a diagram of an example of a representative sub-pixel included in the display device of FIG. 1.

In FIG. 3, a sub-pixel positioned on an i-th horizontal line and connected to a j-th data line DLj is shown for convenience of description.

Referring to FIG. 3, the sub-pixel PXij included in the display device 1 may include a light emitting element LD, transistors T1 to T7, and a storage capacitor Cst. The sub-pixel PXij is not limited to a structure shown in FIG. 3 and may have various structures. Hereinafter, it is assumed that the sub-pixel PXij has the structure shown in FIG. 3.

A first electrode (for example, an anode) of the light emitting element LD may be connected to a fourth node N4 and a second electrode (for example, a cathode) may be connected to a second driving power line VSSL supplying the second driving power VSS. The light emitting element LD generates light with a predetermined luminance in response to a current amount supplied from the first transistor T1.

In an embodiment, the light emitting element LD may be an organic light emitting diode including an organic emission layer. In another embodiment, the light emitting element LD may be an inorganic light emitting element formed of an inorganic material. The light emitting element LD may have a form in which inorganic light emitting elements are connected in parallel and/or in series between the second driving power line VSSL and the fourth node N4.

A first electrode of the first transistor T1 (e.g., driving transistor) is connected to a second node N2 and a second electrode is connected to a third node N3. A gate electrode of the first transistor T1 is connected to a first node N1. The first transistor T1 may control a driving current Id flowing from a first driving power line VDDL to the second driving power line VSSL via the light emitting element LD in response to a voltage of the first node N1. The first driving power line VDDL may be set to a voltage higher than that of the second driving power line VSSL.

The second transistor T2 is connected between the j-th data line DLj and the second node N2. A gate electrode of the second transistor T2 is connected to an i-th scan line SLi. The second transistor T2 is turned on by a gate-on level of a scan signal supplied to the i-th scan line SLi to electrically connect the j-th data line DLj and the second node N2.

The third transistor T3 is connected between the first electrode (e.g., the fourth node N4) of the light emitting element LD and a power line PL that supplies the initialization voltage Vint. A gate electrode of the third transistor T3 is connected to the i-th scan line SLi. The third transistor T3 is turned on by the gate-on level of the scan signal supplied to the i-th scan line SLi to supply a voltage of the initialization voltage Vint to the first electrode (e.g., the fourth node N4) of the light emitting element LD.

The fourth transistor T4 is connected between the first node N1 and the power line PL. A gate electrode of the fourth transistor T4 is connected to an (i−1)-th scan line SLi-1. The fourth transistor T4 is turned on by a gate-on level of a scan signal supplied to the (i−1)-th scan line SLi-1 to supply a voltage of the initialization voltage Vint to the first node N1.

The fifth transistor T5 is connected between the first driving power line VDDL supplying the first driving power VDD and the second node N2. A gate electrode of the fifth transistor T5 is connected to an i-th emission control line Ei. The fifth transistor T5 is turned on by a gate-on level of an emission control signal supplied to the i-th emission control line Ei.

The sixth transistor T6 is connected between a second electrode (e.g., the third node N3) of the first transistor T1 and the first electrode (e.g., the anode) of the light emitting element LD. A gate electrode of the sixth transistor T6 is connected to the i-th emission control line Ei. The sixth transistor T6 is turned on by the gate-on level of the emission control signal supplied to the i-th emission control line Ei. Therefore, the fifth transistor T5 and the sixth transistor T6 may be simultaneously controlled.

The seventh transistor T7 is connected between the second electrode (e.g., the third node N3) of the first transistor T1 and the first node N1. A gate electrode of the seventh transistor T7 is connected to the i-th scan line SLi. The seventh transistor T7 is turned on by the gate-on level of the scan signal supplied to the i-th scan line SLi to electrically connect the second electrode of the first transistor T1 and the first node N1. When the seventh transistor T7 is turned on, the first transistor T1 is connected in a diode form.

The storage capacitor Cst may be connected between the first driving power line VDDL and the first node N1.

Additionally, the scan line to which the transistors T2, T3, T4, and T7 are connected may be variously changed. For example, the fourth transistor T4 may be connected to a separate scan line other than the (i−1)-th scan line SLi-1 to be driven. Similarly, the third transistor T3 may be connected to a separate scan line other than the i-th scan line Si to be driven.

Figure 4A:
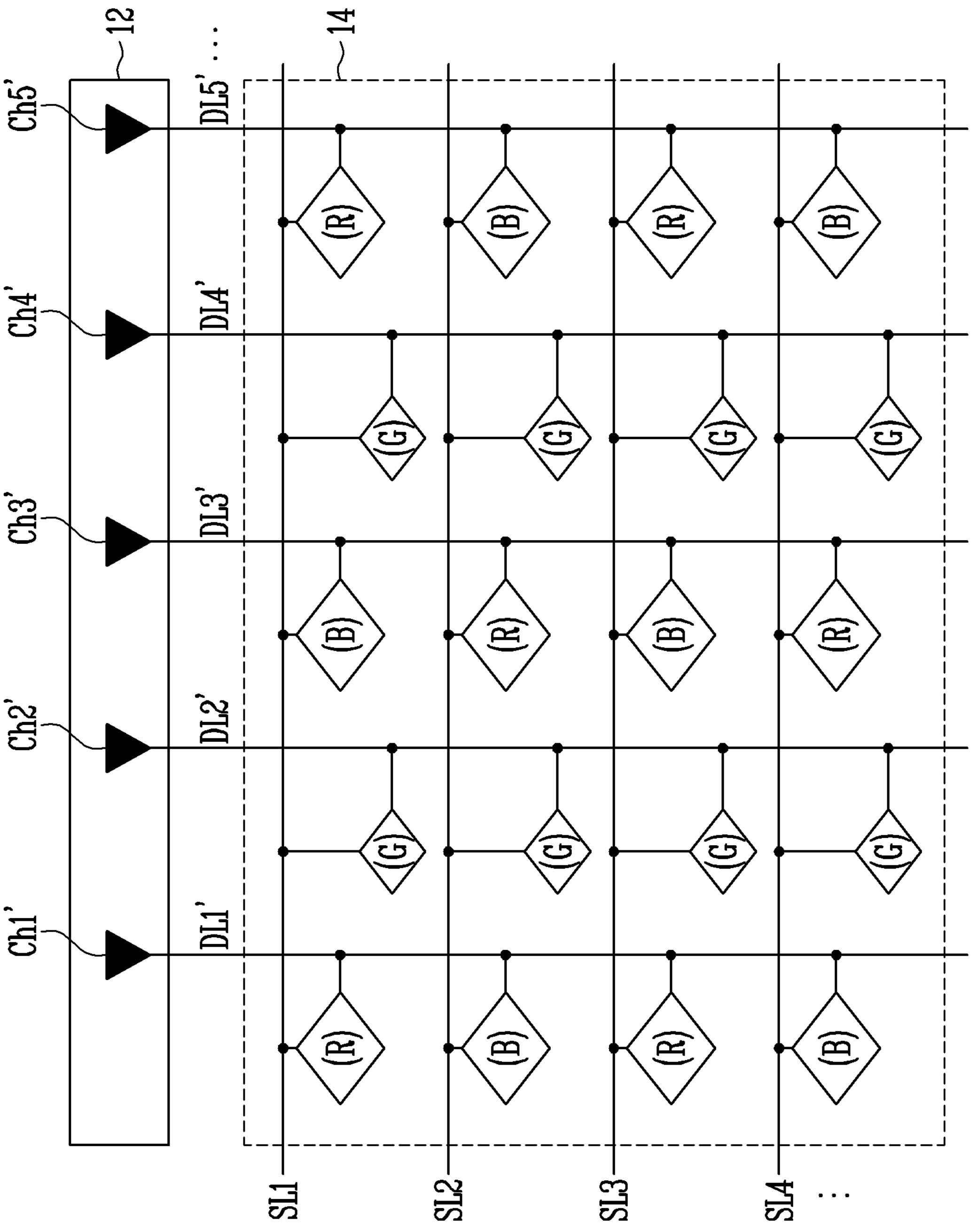
FIGS. 4A and 4B are schematic diagrams of embodiments of a data driver and a pixel unit of FIG. 1.
Figure 4B:
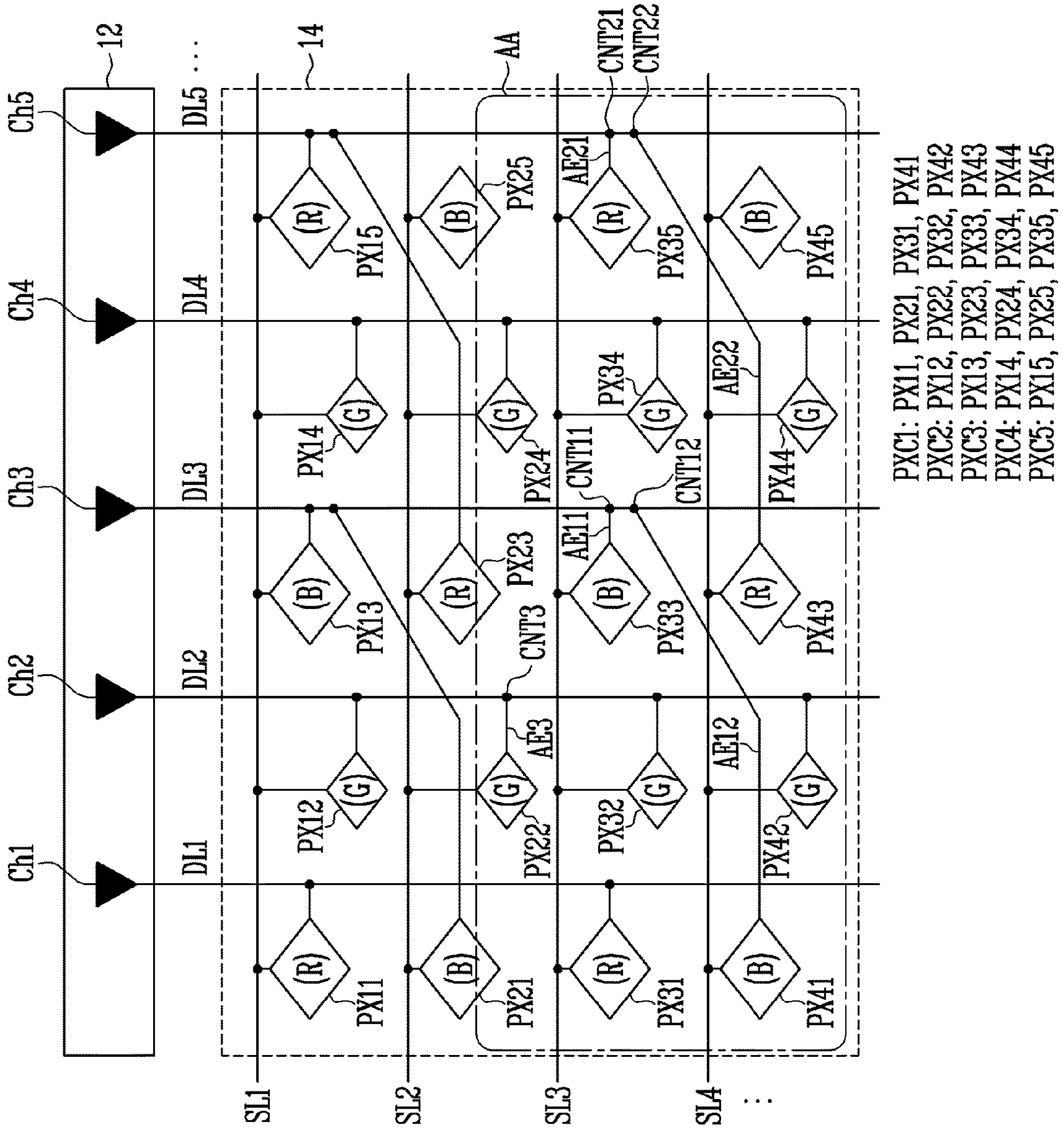
Figure 5A:
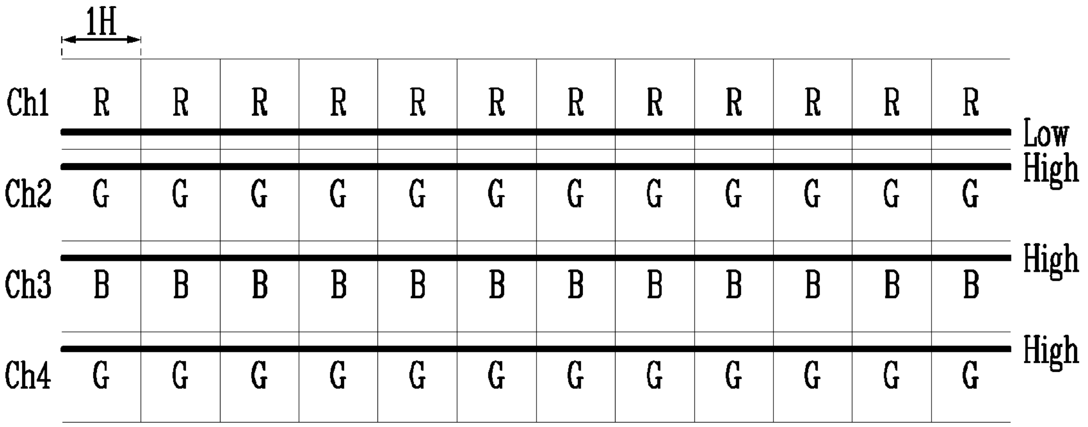
FIGS. 5A, 5B, and 5C are diagrams illustrating an effect of the embodiment shown in FIG. 4B.
Figure 5B:
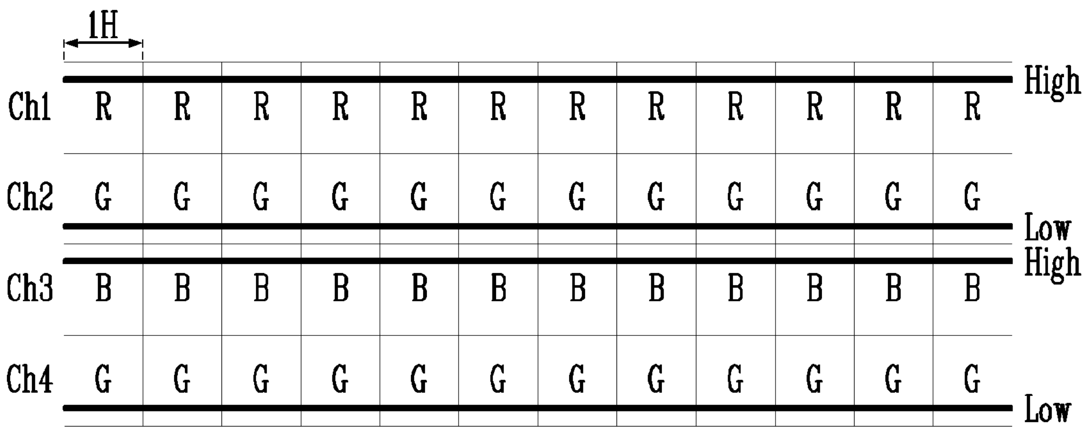
Figure 5C:
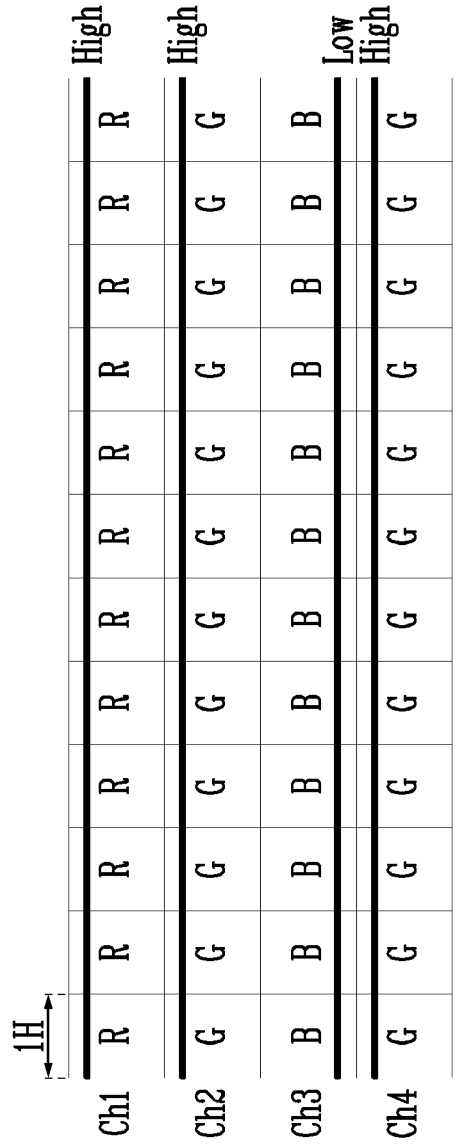

FIGS. 4A and 4B are schematic diagrams of embodiments the data driver and the pixel unit of FIG. 1. FIGS. 5A, 5B, and 5C are diagrams illustrating an effect of the embodiment shown in FIG. 4B.

Referring to FIGS. 1 and 4A, the display device 1 may include the data driver 12 that supplies a data signal to each of data lines DL1' to DL5', and the pixel unit 14 including a plurality of sub-pixels PXij for emitting red light R, green light G, and blue light B.

In the pixel unit 14, the plurality of sub-pixels PXij for emitting red light R, green light G, and blue light B may be arranged in a PENTILE™ pixel structure. In the PENTILE™ pixel structure according to an embodiment, the sub-pixels PXij for emitting red light R and blue light B may be alternately connected to the same data line (for example, DL1', DL3', and DL5') along the longitudinal direction of the data lines DL1' to DL5' and the sub-pixels for emitting green light G may be successively connected to the same data line (for example, DL2' and DL4') along the extension direction of the data lines DL1' to DL5'.

The data driver 12 may include a plurality of source channels Ch1' to Ch5'. The respective source channels Ch1' to Ch5' may be connected to the data lines DL1' to DL5' in one to one (1:1). The second' and fourth' source channels Ch2' and Ch4' may be set to output only a data signal for one color, and the first', third', and fifth' source channels Ch1', Ch3', and Ch5') may be set to alternately output a data signal for two colors. For example, the second' and fourth' source channels Ch2' and Ch4' may supply only a green data signal to the data lines (for example, DL2' and DL4') to which the sub-pixels PXij are connected for each one horizontal period, and the first', third', and fifth' source channels Ch1', Ch3', and Ch5' may alternately supply a red data signal and a blue data signal with different voltage levels to the data lines (for example, DL1', DL3', and DL5) to which the sub-pixels PXij are connected for each one horizontal period.

Accordingly, since the first', third', and fifth' source channels Ch1', Ch3', and Ch5' are required to alternately supply the red data signal and the blue data signal with different voltage levels to the data lines (for example, DL1', DL3', and DL5) to which the sub-pixels PXij for emitting red light R and blue light B are connected for each one horizontal period, the peak current of the display device 1 increases whenever the voltage level of a data signal varies. Thus, the power consumption of the display device 1 increases.

In order to solve these problems, e.g., the increased peak current and the increased power consumption, as shown in FIG. 4B, not only the second and fourth source channels Ch2 and Ch4 but also the first, third, and fifth source channels Ch1, Ch3, and Ch5 may be set to output only a data signal of one color.

For example, in the pixel unit 14 shown in FIG. 4B, similar to the embodiment shown in FIG. 4A, the sub-pixels PXij for emitting red light R, green light G, and blue light B may be arranged in a PENTILE™ pixel structure.

More specifically, the first-first sub-pixel PX11, the first-second sub-pixel PX12, the first-third sub-pixel PX13, the first-fourth sub-pixel PX14, and the first-fifth sub-pixel PX15 disposed in a first pixel row may be connected to a scan line SL1. The second-first sub-pixel PX21, the second-second sub-pixel PX22, the second-third sub-pixel PX23, the second-fourth sub-pixel PX24, and the second-fifth sub-pixel PX25 disposed in a second pixel row may be connected to a second scan line SL2. The third-first sub-pixel PX31, the third-second sub-pixel PX32, the third-third sub-pixel PX33, the third-fourth sub-pixel PX34, and the third-fifth sub-pixel PX35 disposed in a third pixel row may be connected to a third scan line SL3. The fourth-first sub-pixel PX41, the fourth-second sub-pixel PX42, the fourth-third sub-pixel PX43, the fourth-fourth sub-pixel PX44, and the fourth-fifth sub-pixel PX45 disposed in a fourth pixel row may be connected to a fourth scan line SL4. The data signal supplied from the data driver 12 to the data lines DL1 to DL5 may be synchronized with the scan signal sequentially supplied to the scan lines SL1 to SL6.

The data driver 12 may include a plurality of source channels Ch1 to Ch5. The respective the source channels Ch1 to Ch5 may be connected to the data lines DL1 to DL5 in one to one (1:1). Each of the source channels Ch1 to Ch5 may be set to output only a data signal for one color.

According to an embodiment, a first source channel Ch1 connected to a first data line DL1 may provide a data signal of a first color, a second source channel Ch2 connected to a second data line DL2 may provide a data signal of a second color, a third source channel Ch3 connected to a third data line DL3 may provide a data signal of a third color, a fourth source channel Ch4 connected to a fourth data line DL4 may provide the data signal of the second color, and a fifth source channel Ch5 connected to a fifth data line DL5 may provide the data signal of the first color. Thus, the first color may be red, the second color may be green, the third color may be blue. Alternatively, the first color may be blue, the second color may be green, and the third color may be red. The sub-pixels PXij may be configured of the light emitting element LD that emits light in a color corresponding to a data signal supplied from the connected data lines DL1 to DL5.

For example, the first source channel Ch1 may be connected to the first data line DL1. The first source channel Ch1 may output a red data signal to be supplied to the sub-pixels PXij for emitting red light R. To this end, the first data line DL1 may be connected to the first-first sub-pixel PX11 and the third-first sub-pixel PX31 of the first pixel column PXC1.

The second source channel Ch2 may be connected to the second data line DL2. The second source channel Ch2 may output a green data signal to be supplied to the sub-pixels PXij for emitting green light G. To this end, the second data line DL2 may be connected to the first-second sub-pixel PX12, the second-second sub-pixel PX22, the third-second sub-pixel PX32, and the fourth-second sub-pixel PX42 of the second pixel column PXC2. For example, an anode AE3 of the second-second sub-pixel PX22 may be electrically connected to the second data line DL2 through a contact hole CNT3.

The third source channel Ch3 may be connected to the third data line DL3. The third source channel Ch3 may output a blue data signal to be supplied to the sub-pixels PXij for emitting blue light B. To this end, the third data line DL3 may be connected to the first-third sub-pixel PX13 and the third-third sub-pixel PX33 of the third pixel column PXC3, and may be connected to the second-first sub-pixel PX21 and the fourth-first sub-pixel PX41 of the first pixel column PXC1 instead of the second-third sub-pixel PX23 and the fourth-third sub-pixel PX43 of the third pixel column PXC3. For example, an anode AE11 of the light emitting element LD (refer to FIG. 3) included in the third-third sub-pixel PX33 may be electrically connected to the third data line DL3 through a contact hole CNT11. For example, an anode AE12 of the light emitting element LD (refer to FIG. 3) included in the fourth-first sub-pixel PX41 may be electrically connected to the third data line DL3 through a contact hole CNT12. The connection relationship between the sub-pixels (for example, PX21 and PX41) and the third data line DL3 is described in more detail with reference to FIG. 6.

The fourth source channel Ch4 may be connected to the fourth data line DL4. The fourth source channel Ch4 may output the green data signal to be supplied to the sub-pixels PXij for emitting green light G. To this end, the fourth data line DL4 may be connected to the first-fourth sub-pixel PX14, the second-fourth sub-pixel PX24, the third-fourth sub-pixel PX34, and the fourth-fourth sub-pixel PX44 of the fourth pixel column PXC4.

The fifth source channel Ch5 may be connected to the fifth data line DL5. The fifth source channel Ch5 may output the red data signal to be supplied to the sub-pixels PXij for emitting red light R. To this end, the fifth data line DL5 may be connected to the first-fifth sub-pixel PX15 and the third-fifth sub-pixel PX35 of the fifth pixel column PXC5, and may be connected to the second-third sub-pixel PX23 and the fourth-third sub-pixel PX43 of the third pixel column PXC3 through a second contact hole VIA2, instead of the second-fifth sub-pixel PX25 and the fourth-fifth sub-pixel PX45 of the fifth pixel column PXC5. For example, an anode AE21 of the light emitting element LD (refer to FIG. 3) included in the third-fifth sub-pixel PX35 may be electrically connected to the fifth data line DL5 through a contact hole CNT21. For example, an anode AE22 of the light emitting element LD (refer to FIG. 3) included in the fourth-third sub-pixel PX43 may be electrically connected to the fifth data line DL5 through a contact hole CNT22. The connection relationship between the sub-pixels (for example, PX35 and PX43) and the fifth data line DL5 is described in more detail with reference to FIG. 6.

The remaining source channels from the fifth source channel Ch5 may have a configuration in which the structure of the first to fourth source channels Ch1 to Ch4 is repeated.

Hereinafter, an effect of the embodiment shown in FIG. 4B is described with reference to FIGS. 5A, 5B, and 5C. For convenience of description, an embodiment in which a pattern displayed on the pixel unit 14 is displayed as any one of a red color pattern, a green color pattern, and a blue color pattern of the maximum grayscale level (for example, 255 grayscale level) on the entire screen will be described.

Referring to FIG. 5A, in the display device 1 according to the embodiment shown in FIG. 4B, in order to display the red color pattern with 255 grayscale level on the pixel unit 14, the first source channel Ch1 may supply a red data signal corresponding to 255 grayscale level to the first data line DL1 for each one horizontal period 1H, each of the second and fourth source channels Ch2 and Ch4 may supply a green data signal corresponding to 0 grayscale level to the second and fourth data lines DL2 and DL4 for each one horizontal period 1H, and the third source channel Ch3 may supply a blue data signal corresponding to 0 grayscale level to the third data line DL3 for each one horizontal period 1H.

Referring to FIG. 5B, in the display device 1 according to the embodiment shown in FIG. 4B, in order to display the green color pattern with 255 grayscale level on the pixel unit 14, the first source channel Ch1 may supply a red data signal corresponding to 0 grayscale level to the first data line DL1 for each one horizontal period 1H, each of the second and fourth source channels Ch2 and Ch4 may supply a green data signal corresponding to 255 grayscale level to the second and fourth data lines DL2 and DL4 for each one horizontal period 1H, and the third source channel Ch3 may supply a blue data signal corresponding to 0 grayscale level to the third data line DL3 for each one horizontal period 1H.

Referring to FIG. 5C, in the display device 1 according to the embodiment shown in FIG. 4B, in order to display the blue color pattern with 255 grayscale level on the pixel unit 14, the first source channel Ch1 may supply a red data signal corresponding to 0 grayscale level to the first data line DL1 for each one horizontal period 1H, each of the second and fourth source channels Ch2 and Ch4 may supply a green data signal corresponding to 0 grayscale level to the second and fourth data lines DL2 and DL4 for each one horizontal period 1H, and the third source channel Ch3 may supply a blue data signal corresponding to 255 grayscale level to the third data line DL3 for each one horizontal period 1H.

As described above, in the embodiment shown in FIG. 4B, the first source channel Ch1 may supply the red data signal (for example, a logic low level) of the same voltage level to the first data line DL1 to which only the sub-pixels PXij for emitting red light R are connected for each one horizontal period 1H in order to the red color pattern on the pixel unit 14, and the third source channel Ch3 may supply the blue data signal (for example, a logic low level) of the same voltage level to the third data line DL3 to which only the sub-pixels PXij for emitting blue light B are connected for each one horizontal period 1H in order to the blue color pattern on the pixel unit 14. Therefore, the embodiment shown in FIG. 4B may minimize the increase of power consumption due to toggling, compared to the embodiment shown in FIG. 4A in which the red data signal (for example, a logic low level) corresponding to 255 grayscale level and the blue data signal (for example, a logic high level) corresponding to 0 grayscale level are required to be alternately supplied for each one horizontal period 1H in order to display the red color pattern on the pixel unit 14 and the blue data signal (for example, a logic low level) corresponding to 255 grayscale level and the red data signal (for example, a logic high level) corresponding to 0 grayscale level are required to be alternately supplied for each one horizontal period 1H in order to display the blue color pattern on the pixel unit 14.

Figure 6:
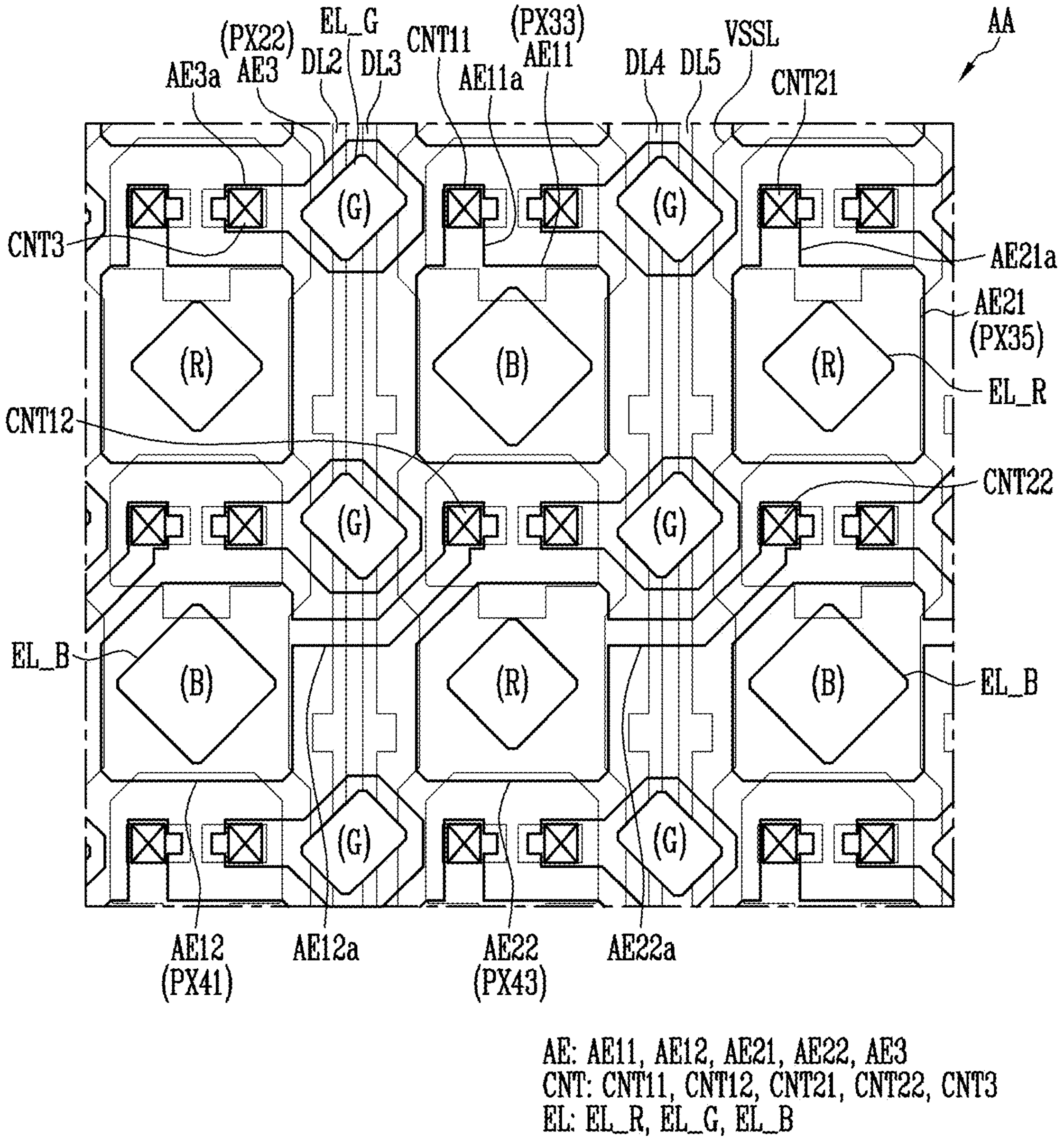
FIG. 6 is a layout diagram of an area AA of FIG. 4B illustrating a pixel circuit and a light emitting element of the pixel unit.

FIG. 6 is a layout diagram of an area AA of FIG. 4B. FIG. 7A is a table showing a difference between anode capacitances of the sub-pixel of the odd-numbered pixel row and the sub-pixel of the even-numbered pixel row receiving the red or blue data signal. FIG. 7B is a table showing deviation of a driving current for each grayscale level between the sub-pixel of the odd-numbered pixel row and the sub-pixel of the even-numbered pixel row receiving the red or blue data signal.

Referring to FIGS. 3, 4B, and 6, each of the sub-pixels PXij for emitting red light R, green light G, and blue light B may include an emission layer EL for emitting red light R, green light G, and blue light B. The shape of each sub-pixel PXij is determined by the shape of the emission layer EL for emitting color light through, e.g., an opening of a black matrix. In FIG. 6, the shape of the sub-pixel PXij is shown as a rhombus shape, but embodiments are not limited thereto. For example, the shape of the sub-pixel PXij may have an elliptical shape or an octagonal shape.

The emission layer EL of each of the sub-pixels PXij may be driven by a pixel circuit PXC to which a corresponding anode AE is connected through a contact hole CNT. The pixel circuit PXC of each of the sub-pixels PXij may be arranged in a line (e.g., in a vertical direction in the drawing) for each color of the emission layer EL along the longitudinal direction of a data line DL. For example, the anode AE of the sub-pixels PXij for emitting red light R or blue light B may be disposed so that at least a portion of the anode AE overlaps with a corresponding pixel circuit PXC in the thickness direction (normal to the plan view shown in the figure) (for example, AE11 and AE21), or may be disposed so that at least a portion of the anode AE overlaps another pixel circuit PXC other than the corresponding pixel circuit PXC in the thickness direction (for example, AE12 and AE22).

For example, the third-third sub-pixel PX33 of the third pixel column PXC3 may include an emission layer EL_B for emitting blue light B, and an eleventh anode AE11 may be connected to a corresponding pixel circuit PXC (for example, the second electrode of the sixth transistor T6) formed in the third pixel column PXC3 through an eleventh contact hole CNT11. For example, the fourth-first sub-pixel PX41 of the first pixel column PXC1 may include the emission layer EL_B for emitting blue light B, and a twelfth anode AE12 may be connected to a corresponding pixel circuit PXC (for example, the second electrode of the sixth transistor T6) formed in the third pixel column PXC3 through a twelfth contact hole CNT12. In other words, the twelfth anode AE12 may be disposed so that at least a portion of the twelfth anode AE12 overlaps another pixel circuit PXC disposed to overlap the first pixel column PXC1 in the thickness direction.

The third-fifth sub-pixel PX35 of the fifth pixel column PXC5 may include an emission layer EL_R for emitting red light R, and a twenty-first anode AE21 may be connected to a corresponding pixel circuit PXC (for example, the second electrode of the sixth transistor T6) formed in the fifth pixel column PXC5 through a twenty-first contact hole CNT21. For example, the fourth-third sub-pixel PX43 of the third pixel column PXC3 may include the emission layer EL_R for emitting red light R, and a twenty-second anode AE22 may be connected to a corresponding pixel circuit PXC (for example, the second electrode of the sixth transistor T6) formed in the fifth pixel column PXC5 through a twenty-second contact hole CNT22. In other words, the twenty-second anode AE22 may be disposed so that at least a portion of the twenty-second anode AE22 overlaps another pixel circuit PXC disposed to overlap the third pixel column PXC3 in the thickness direction.

The second-second sub-pixel PX22 of the second pixel column PXC2 may include an emission layer EL_G for emitting green light G, and a third anode AE3 may be connected to a corresponding pixel circuit PXC (for example, the second electrode of the sixth transistor T6) formed in the second pixel column PXC2 through a third contact hole CNT3.

Accordingly, the anodes of the sub-pixels PXij for emitting red light R or blue light B may have different areas and/or lengths in each even-numbered pixel row and odd-numbered pixel row. The anodes of the sub-pixels PXij for emitting green light G may have substantially the same area and/or length in all pixel rows.

In the embodiment shown in FIG. 6, the anodes AE11 and AE21 of the sub-pixels PX33 and PX35 for emitting red light R or blue light B disposed in the odd-numbered pixel row may have a substantially quadrangular shape, and may include first connection portions AE11*a* and AE21*a* extending from the quadrangular shape to the contact hole CNT. However, the anodes AE12 and AE22 of the sub-pixels PX41 and PX43 for emitting red light R or blue light B disposed in the even-numbered pixel row may have a generally quadrangular shape chamfered at one vertex, and may include second connection portions AE12*a* and AE22*a* extending from the quadrangular shape to the contact hole CNT. Thus, the area of the anode of the sub-pixels PX41 and PX43 for emitting red light R or blue light B disposed in the even-numbered pixel row may be greater than the area of the sub-pixels PX33 and PX35 for emitting red light R or blue light B disposed in the odd-numbered pixel row. In addition, the length from one end to another end of the second connection portions AE12*a* and AE22*a* may be longer than the length from one end to another end of the first connection portions AE11*a* and AE21*a*.

The anode of the second-second sub-pixels PX22 for emitting green light G may have a substantially octagonal shape in all pixel rows identically, and may include a connection portion AE3*a* extending from the octagonal shape to the contact hole CNT.

Referring to the table shown in FIG. 7A, since the anodes of the sub-pixels PXij for emitting red light R or blue light B may have a different area and/or length for each even-numbered pixel row and the odd-numbered pixel row, the capacitance generated at the anode may be different. Thus, the capacitance generated at the anode of the light emitting element LD may be a parasitic capacitance generated between the anode of the light emitting element LD and the second driving power line VSSL. However, embodiments are not limited thereto, and the capacitance generated at the anode of the light emitting element LD may be a parasitic capacitance generated between various lines disposed adjacent to the anode of the light emitting element LD.

For example, the anode capacitance of the fourth-third sub-pixel PX43 disposed in the even-numbered pixel row and for emitting red light R may be 69.27 fF, and the anode capacitance of the third-fifth sub-pixel PX35 disposed in the odd-numbered pixel row and for emitting red light R may be 66.91 fF. For example, the difference between anode capacitances of the sub-pixel (for example, PX43) of the even-numbered pixel row and the sub-pixel (for example, PX35) of the odd-numbered pixel row receiving the same red data signal may be 2.36 fF. In addition, the anode capacitance of the fourth-first sub-pixel PX41 disposed in the even-numbered pixel row and for emitting blue light B may be 65.14 fF, and the anode capacitance of the third-third sub-pixel PX33 disposed in the odd-numbered pixel row and for emitting blue light B may be 62.79 fF. For example, the difference between anode capacitances of the sub-pixel (for example, PX41) of the even-numbered pixel row and the sub-pixel (for example, PX33) of the odd-numbered pixel row receiving the same blue data signal may be 2.35 fF.

Referring to the table shown in FIG. 7B, when the anode capacitances between the sub-pixels (for example, PX41 and PX43) of the even-numbered pixel row and the sub-pixels PX33 and PX35 of the odd-numbered pixel row receiving the red R or blue data signal are different from each other, a deviation occurs in the magnitude of the driving current Id even though a data signal of the same grayscale level GS is received.

For example, when the red data signal corresponding to 255 grayscale level is provided through the fifth data line DLS, the driving current difference I_R between the sub-pixel (for example, PX43) of the even-numbered pixel row and the sub-pixel (for example, PX35) of the odd-numbered pixel row may be 1.80E-10 A. For example, when the blue data signal corresponding to the 255 grayscale level is provided through the third data line DL3, the driving current difference I_R between the sub-pixel (for example, PX41) of the even-numbered pixel row and the sub-pixel (for example, PX33) of the odd-numbered pixel row may be 1.19E-10 A.

In addition, when a red data signal corresponding to 127 grayscale level is provided through the fifth data line DLS, the driving current difference I_R between the sub-pixels (for example, PX43) of the even-numbered pixel row and the sub-pixel (for example, PX35) of the odd-numbered pixel row may be 4.60E-11 A. For example, when a blue data signal corresponding to 127 grayscale level is provided through the third data line DL3, the driving current difference I_R between the sub-pixel (for example, PX41) of the even-numbered pixel row and the sub-pixel (for example, PX33) of the odd-numbered pixel row may be 4.50E-11 A.

In addition, when a red data signal corresponding to 87 grayscale level is provided through the fifth data line DL5, the driving current difference I_R between the sub-pixel (for example, PX43) of the even-numbered pixel row and the sub-pixel (for example, PX35) of the odd-numbered pixel row may be 2.18E-11 A. For example, when a blue data signal corresponding to 87 grayscale level is provided through the third data line DL3, the driving current difference I_R between the sub-pixel (for example, PX41) of the even-numbered pixel row and the sub-pixel (for example, PX33) of the odd-numbered pixel row may be 2.33E-11 A.

In addition, when a red data signal corresponding to 31 grayscale level is provided through the fifth data line DL5, the driving current difference I_R between the sub-pixel (for example, PX43) of the even-numbered pixel row and the sub-pixel (for example, PX35) of the odd-numbered pixel row may be 2.14E-12 A. For example, when a blue data signal corresponding to 31 grayscale level is provided through the third data line DL3, the driving current difference I_R between the sub-pixel (for example, PX41) of the even-numbered pixel row and the sub-pixel (for example, PX33) of the odd-numbered pixel row may be 2.80E-12 A.

In addition, when a red data signal corresponding to 11 grayscale level is provided through the fifth data line DL5, the driving current difference I_R between the sub-pixel (for example, PX43) of the even-numbered pixel row and the sub-pixel (for example, PX35) of the odd-numbered pixel row may be 4.55E-13 A. For example, when a blue data signal corresponding to 11 grayscale level is provided through the third data line DL3, the driving current difference I_R between the sub-pixel (for example, PX41) of the even-numbered pixel row and the sub-pixel (for example, PX33) of the odd-numbered pixel row may be 3.80E-13 A.

Accordingly, since the luminance of the sub-pixel PXij varies in response to the magnitude of the driving current Id, when a deviation in the driving current Id occurs between the sub-pixel of the odd-numbered pixel row and the sub-pixel of the even-numbered pixel row receiving the data signal of the same grayscale level, the user of the display device may recognize a luminance difference between pixel rows, and thus display quality may be reduced. According to the table of FIG. 7B, as the grayscale level GS increases, the deviation of the driving current Id increases, and thus the user may more easily recognize the luminance difference between the pixel rows as the grayscale level GS increases.

Hereinafter, a method for solving such a problem in accordance with the principles and illustrative embodiments of the invention is described with reference to FIGS. 8, 9, 10A and 10B.

Figures 8, 9:
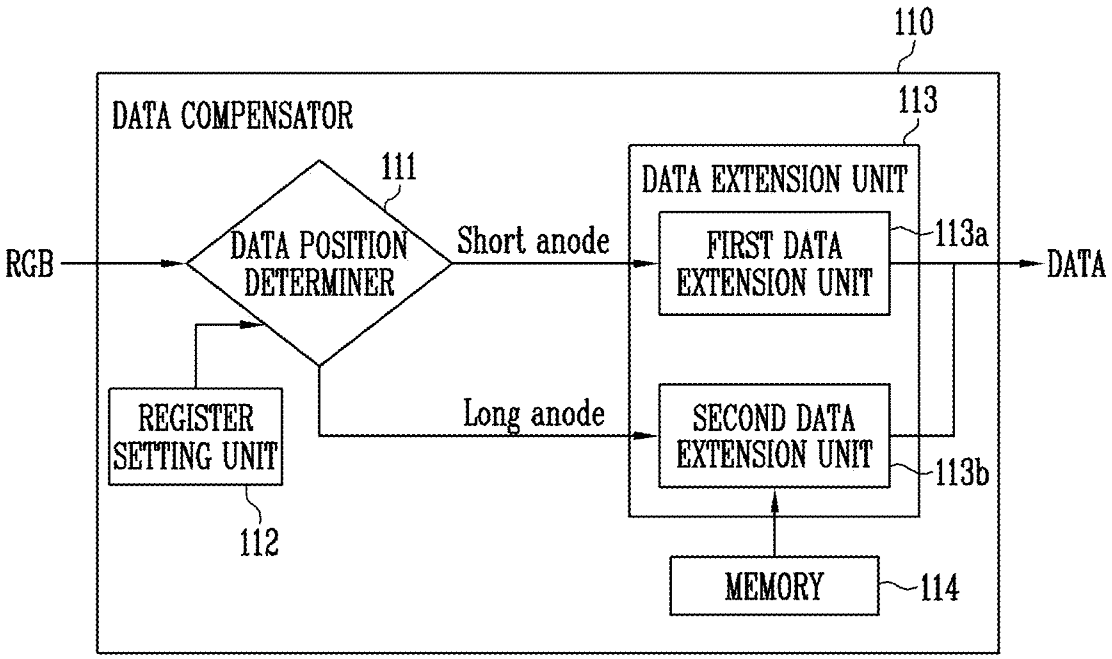
FIG. 8 is a block diagram of the data compensator of FIG. 1.
FIG. 9 is a table for describing the register setting unit of FIG. 8.

FIG. 8 is a block diagram of the data compensator of FIG. 1. FIG. 9 is a table of the register setting unit of FIG. 8. FIG. 10A is a table of the data extension unit of FIG. 8. FIG. 10B is an embodiment of a lookup table stored in a memory of FIG. 8. Hereinafter, for convenience of description, an embodiment, in which the length of the anode of the odd-numbered pixel row is shorter than the length of the anode of the even-numbered pixel row shown in FIG. 6, will be described. A reverse case is also possible according to design choice.

Referring to FIGS. 1, 6, and 8, the data compensator 110 may include a data position determiner 111, the register setting unit 112, the data extension unit 113, and the memory 114.

The data compensator 110 may receive the input image data RGB from the external processor and determine whether the input image data RGB is the data corresponding to the even-numbered pixel row or the data corresponding to the odd-numbered pixel row.

According to an embodiment, the data compensator 110 may receive an anode path register value APC that determines an anode path state from the register setting unit 112. Thus, the register setting unit 112 may receive the anode path register value APC from the external processor through an interface unit. The anode path register value APC may be expressed by 1 bit.

For example, when the anode path register value APC is 'H' (or 1), the length of the anodes AE11 and AE21 (e.g., the first connection portions AE11*a* and AE21*a*) of the sub-pixels (for example, PX33 and PX35) disposed in the odd-numbered pixel row may be set to be shorter than the length of the anodes AE12 and AE22 (e.g., the second connection portions AE12*a* and AE22*a*) of the sub-pixels PX41 and PX43 disposed in the even-numbered pixel row. Conversely, when the anode path register value APC is 'L' (or 0), the length of the anodes AE11 and AE21 (e.g., the first connection portions AE11*a* and AE21*a*) of the sub-pixels (for example, PX33 and PX35) disposed in the odd-numbered pixel row may be set to be longer than the length of the anodes AE12 and AE22 (e.g., the second connection portions AE12*a* and AE22*a*) of the sub-pixels PX41 and PX43 disposed in the even-numbered pixel row. According to an embodiment, the anode path register value APC may be set to 'H' as a default value.

The data extension unit 113 may generate the output image data DATA having a value greater than that of the input image data RGB in order to compensate for the difference in driving current Id according to the difference of the anode area and/or length of the sub-pixel PXij. For example, when the number of bits of the input image data RGB is i (where i is a natural number), the output image data DATA provided by the timing controller 11 to the data driver 12 may have (i+j) (where j is a natural number) number of bits. The reason and principle of the data extension unit 113 extending the number of bits of the output image data DATA are described as follows.

Even though the same red data signal is applied to the sub-pixels PX35 and PX43, the anode capacitance of the sub-pixel PX43 of the even-numbered pixel row, which has the anode AE22 with a relatively longer length, may be larger, and thus the emission luminance may decrease. Therefore, the data extension unit 113 may generate the output image data DATA to increase the data voltage in order to display a luminance corresponding to the actual input image data RGB. When the input image data RGB has 8 bits to express 255 grayscale levels, the maximum input image data to express the maximum grayscale level may be expressed as "11111111". Since the maximum output image data for compensating for the deviation in the driving current Id of the maximum input image data exceeds 8 bits, the output image data DATA may be set to the number of bits greater than 8 bits, for example, a size of 10 bits. Thus, the output image data DATA may be expressed by adding an extension bit of 2 bits to the input image data RGB.

The data extension unit 113 may include a first data extension unit 113*a* for compensating for the input image data RGB corresponding to the anode having the relatively short length and a second data extension unit 113*b* for compensating for the input image data RGB corresponding to the anode having the relatively long length.

When the anode path register value APC is 'H', the luminance of the sub-pixel PX35 of the odd-numbered pixel row, which has the anode AE21 with the relatively short length, may be greater than the luminance of the sub-pixel PX43 of the even-numbered pixel row, which has the anode AE22 with the relatively long length. Therefore, the first data extension unit 113*a* may set the extension bit corresponding to the odd-numbered pixel row as '00' as a default value, and the second data extension unit 113*b* may set the extension bit corresponding to the even-numbered pixel row to any one of '00', '01', '10', and '11' based on the lookup table (refer to FIG. 10B) set according to the grayscale level GS and the emission color R, G, and B of the sub-pixel PXij. The lookup table may be stored in the memory 114. The second data extension unit 113*b* may read the lookup table from the memory 114. Thus, as the extension bits added to the input image data RGB increase in an order of '00', '01', '10', and '11', the output image data DATA for generating a larger data signal (e.g., data voltage) may be generated.

For example, when the anode path register value APC is 'H', the output image data DATA of the third-fifth sub-pixel PX35 for emitting red light R and the third-third sub-pixel PX33 for emitting blue light B of the odd-numbered pixel row, which has the anode AE21 with the relatively short length, may be expressed as '1111111100'. For example, the output image data DATA of the fourth-third sub-pixel PX43 for emitting red light R of the even-numbered pixel row, which has the anode AE22 with the relatively long length, may be expressed as '1111111101', and the output image data DATA of the fourth-first sub-pixel PX41 for emitting blue light B of the even-numbered pixel row, which has the anode AE12 with the relatively long length, may be expressed as '111111100'.

Hereinafter, a method of setting a lookup table LUT in accordance with the principles an illustrative embodiment of the invention is described with reference to FIGS. 10A and 10B.

According to an embodiment, the extension bit added to the input image data RGB may be determined based on the percentage to which the difference in value of the driving current Id due to the difference of the anode area and/or length corresponds, compared to the magnitude of the driving current Id that changes one grayscale level GR for each grayscale level GS. For example, when the difference in value of the driving current Id due to the difference of the anode area and/or length are about 0 to about 25%, about 26 to about 50%, about 51 to about 75%, and about 76 to about 100%, compared to the magnitude of the driving current Id that changes one grayscale level GR for each grayscale level GS, the extension bit may be expressed as '00', '01', '10', and '11', respectively.

Referring to the table shown in FIG. 10A, when one grayscale level GR is changed from 244 grayscale level GR to 255 grayscale level GR, the driving current Id of the reference red sub-pixel PXij may be changed by 5.00E-10 A, and the driving current Id of the reference blue sub-pixel PXij may be changed by 7.70E-10 A. Thus, the difference of the driving current Id between the red sub-pixel PX35 of the odd-numbered pixel row, which has the anode AE21 with the relatively short length, and the red sub-pixel PX43 of the even-numbered pixel row, which has the anode AE22 with the relatively long length, may be 1.80E-10 A, and the difference of the driving current Id between the blue sub-pixel PX33 of the odd-numbered pixel row, which has the anode AE21 with the relatively short length, and the blue sub-pixel PX41 of the even-numbered pixel row, which has the anode AE22 with the relatively long length, may be 1.20E-10 A. In this case, since 1.80E-10 A corresponds to 35.4% of 5.00E-10 A and 1.20E-10 A corresponds to 15.4% of 7.70E-10 A, referring to the lookup table shown in FIG. 10B, the red sub-pixel PXij with 255 grayscale level GR may correspond to the extension bit '01', and the blue sub-pixel PXij with 255 grayscale level GR may correspond to the extension bit '00'.

In addition, referring to the table shown in FIG. 10A, when one grayscale level GR is changed from 86 grayscale level GR to 87 grayscale level GR or one grayscale level GR is changed from 87 grayscale level GR to 88 grayscale level GR, the driving current Id of the reference red sub-pixel PXij may be changed by 1.20E-10 A, and the driving current Id of the reference blue sub-pixel PXij may be by 2.40E-10 A. Thus, the difference in the driving current Id between the red sub-pixel PX35 of the odd-numbered pixel row, which has the anode AE21 with the relatively short length, and the red sub-pixel PX43 of the even-numbered pixel row, which has the anode AE22 with the relatively long length, may be 2.20E-11 A, and the difference in the driving current Id between the blue sub-pixel PX33 of the odd-numbered pixel row, which has the anode AE21 with the relatively short length, and the blue sub-pixel PX41 of the even-numbered pixel row, which has the anode AE22 with the relatively long length, may be 2.30E-11 A. In this case, since 2.20E-11 A corresponds to 18.3% of 1.20E-10 A and 2.30E-11 A corresponds to 9.8% of 2.40E-10 A, referring to the lookup table shown in FIG. 10B, the red sub-pixel PXij of 87 grayscale level GR may corresponds to the extension bit '00', and the blue sub-pixel PXij of 87 grayscale level GR may correspond to the extension bit '00'.

Similarly, referring to the table shown in FIG. 10A, when one grayscale level GR is changed from 10 grayscale level GR to 11 grayscale level GR or one grayscale level GR is changed from 11 grayscale level GR to 12 grayscale level GR, the driving current Id of the reference red sub-pixel PXij may be changed by 9.50E-12 A, and the driving current Id of the reference blue sub-pixel PXij may be by 2.10E-11 A. Thus, the difference in the driving current Id between the red sub-pixel PX35 of the odd-numbered pixel row, which has the anode AE21 with the relatively short length, and the red sub-pixel PX43 of the even-numbered pixel row, which has the anode AE22 with the relatively long length, may be 4.60E-13 A, and the difference in the driving current Id between the blue sub-pixel PX33 of the odd-numbered pixel row, which has the anode AE21 with the relatively short length, and the blue sub-pixel PX41 of the even-numbered pixel row, which has the anode AE22 with the relatively long length, may be 3.80E-13 A. In this case, since 4.60E-13 A corresponds to 4.8% of 9.50E-12 A and 3.80E-13 A corresponds to 1.8% of 2.10E-11 A, referring to the lookup table shown in FIG. 10B, the red sub-pixel PXij of 11 grayscale level GR may corresponds to the extension bit '00', and the blue sub-pixel PXij of 11 grayscale level GR may correspond to the extension bit '00'. In FIGS. 10A and 10B, data is described for only some grayscale levels based on 255 grayscale level, but this is an example, and it is apparent that data for the remaining grayscale levels may be experimentally calculated.

The display device (e.g., the data compensator 110) according to an embodiment may use the lookup table LUT for compensating for the difference in the driving current Id between the even-numbered pixel row and the odd-numbered pixel row for each of colors R, G, and B of the sub-pixel PXij for each grayscale level GR. Therefore, in the PENTILE™ pixel structure, the display device (e.g., the data compensator 110) may supply only data signal of one color to one data line. Thus, display devices (e.g., the data compensator 110) constructed according to the principles and illustrative embodiments of the invention may reduce power consumption and reduce or prevent a difference between the luminance of the even-numbered pixel row and the odd-numbered pixel row.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:

a data compensator to generate output image data by adding an extension bit to input image data received from an external processor;

a data driver to supply a data voltage corresponding to the output image data to each of data lines; and a pixel unit including a plurality of sub-pixels, wherein a first data line for providing a first color data signal is connected to a first sub-pixel disposed in an odd-numbered pixel row through a first anode, and is connected to a second sub-pixel disposed in an even-numbered pixel row through a second anode having a different size than the first anode, where the first sub-pixel and the second sub-pixel are same color sub-pixels;

wherein the first anode comprises a first connection portion connected to a first contact hole, wherein the second anode comprises a second connection portion connected to a second contact hole, the second connection portion having a different length than the first connection portion, and wherein the data compensator is configured to add a first extension bit to the input image data corresponding to the first sub-pixel and add a second extension bit to the input image data corresponding to the second sub-pixel; wherein:

the extension bit is 2 bits, the first extension bit is '00', and the second extension bit is set to any one of '00', '01', 10', and '11' based on a lookup table set according to each grayscale level and each emission color of the sub-pixels; and wherein the second extension bit is determined based on a ratio of a difference in value between a driving current of the first sub-pixel and a driving current of the second sub-pixel to a magnitude of a driving current that changes 1 grayscale value at each grayscale level.

2. The display device of claim 1, wherein the data voltage has a magnitude that increases as the second extension bit increases in an order of '00', '01', '10', and '11'.

3. The display device of claim 1, wherein:

when the ratio of the difference in value between the driving current of the first sub-pixel and the driving current of the second sub-pixel to the magnitude of the driving current that changes 1 grayscale value has a range of about 0 to about 25%, the second extension bit is set to '00', when the ratio of the difference in value between the driving current of the first sub-pixel and the driving current of the second sub-pixel to the magnitude of the driving current that changes 1 grayscale value has a range of about 26 to about 50%, the second extension bit is set to '01', when the ratio of the difference in value between the driving current of the first sub-pixel and the driving current of the second sub-pixel to the magnitude of the driving current that changes 1 grayscale value has a range of about 51 to about 75%, the second extension bit is set to '10', and when the ratio of the difference in value between the driving current of the first sub-pixel and the driving current of the second sub-pixel to the magnitude of the driving current that changes 1 grayscale value has a range of about 76 to about 100%, the second extension bit is set to '11'.

4. The display device of claim 1, wherein the data compensator further comprises a data position determiner to determine whether the input image data corresponds to the first sub-pixel or the second sub-pixel.

5. The display device of claim 4, wherein the data position determiner is configured to determine whether a length of the first anode is shorter or longer than a length of the second anode based on an anode path register value.

6. The display device of claim 5, wherein:

the anode path register value is 1 bit, and the data position determiner is configured to determine that the length of the first anode is shorter than the length of the second anode when the anode path register value is '1', and to determine that the length of the first anode is longer than the length of the second anode when the anode path register value is '0'.

7. The display device of claim 1, wherein a length from one end to another end of the first anode is shorter than a length from one end to another end of the second anode.

8. The display device of claim 1, wherein an area of the first anode is less than an area of the second anode.

9. The display device of claim 1, wherein a second data line for providing a second color data signal is connected to a third sub-pixel disposed in the odd-numbered pixel row through a third anode, and is connected to a fourth sub-pixel disposed in the even-numbered pixel row through a fourth anode having a substantially same size as the third anode.

10. The display device of claim 9, wherein the first color data signal is for a red or blue image, and the second color data signal is for a green image.

11. The display device of claim 9, wherein the first sub-pixel and the second sub-pixel are disposed in different pixel rows and different pixel columns, and the third sub-pixel and the fourth sub-pixel are disposed in different pixel rows and a same pixel column.

12. The display device of claim 1, wherein the data driver comprises a plurality of source channels, and each of the plurality of source channels is configured to provide a data voltage of one color to a corresponding data line.

13. The display device of claim 1, wherein each of the sub-pixels comprises a light emitting element and a pixel circuit, and the pixel circuit comprises:

a first transistor including a first electrode connected to a second node connected to a first driving power line and a second electrode connected to a third node;

a second transistor including a first electrode connected to a corresponding data line and a second electrode connected to the second node;

a third transistor including a first electrode connected to a first electrode of the light emitting element and a second electrode connected to a power line for supplying an initialization voltage;

a fourth transistor including a second electrode connected to the power line and a first node connected to a gate electrode of the first transistor;

a fifth transistor including a first electrode connected to the first driving power line and a second electrode connected to the second node;

a sixth transistor connected between the third node and the light emitting element; and a seventh transistor including a first electrode connected to the first node and a second electrode connected to the third node.

14. The display device of claim 13, wherein the pixel circuit further comprises a storage capacitor disposed between the first driving power line and the first node.

15. The display device of claim 13, wherein the first sub-pixel is connected to the sixth transistor through the first anode, and the second sub-pixel is connected to the sixth transistor through the second anode.

16. The display device of claim 13, wherein:

the light emitting element comprises an emission layer, the emission layer of the first sub-pixel overlaps at least a portion of the pixel circuit of the first sub-pixel in a thickness direction, and the emission layer of the second sub-pixel does not overlap the pixel circuit of the second sub-pixel in the thickness direction.

17. A method of compensating image data for driving pixels in a display device, in which a first data line for providing a first color data voltage is connected to a first sub-pixel disposed in an odd-numbered pixel row through a first anode and is connected to a second sub-pixel disposed in an even-numbered pixel row through a second anode having a different size than the first anode, the method comprising:

receiving input image data from an external processor;

determining whether the input image data corresponds to the first sub-pixel or the second sub-pixel; where the first sub-pixel and the second sub-pixel are same color sub-pixels; and generating output image data by adding a first extension bit to the input image data corresponding to the first sub-pixel and by adding a second extension bit to the input image data corresponding to the second sub-pixel, wherein the first anode comprises a first connection portion connected to a first contact hole, and wherein the second anode comprises a second connection portion connected to a second contact hole, the second connection portion having a different length than the first connection portion; wherein:

each of the first and second extension bits is 2 bits, the first extension bit is '00', and the second extension bit is set to any one of '00' '01', '10', and '11' based on a lookup table set according to each grayscale level and each emission color of each of the first and second sub-pixels; and wherein the second extension bit is determined based on a ratio of a difference in value between a driving current of the first sub-pixel and a driving current of the second sub-pixel to a magnitude of a driving current that changes 1 grayscale value at each grayscale level.

18. The method of claim 17, wherein the first color data voltage has a magnitude that increases as the second extension bit increases in an order of '00', '01', '10', and '11'.

19. The method of claim 17, wherein:

when the ratio of the difference in value between the driving current of the first sub-pixel and the driving current of the second sub-pixel to the magnitude of the driving current that changes 1 grayscale value has a range of about 0 to about 25%, the second extension bit is set to '00', when the ratio of the difference in value between the driving current of the first sub-pixel and the driving current of the second sub-pixel to the magnitude of the driving current that changes 1 grayscale value has a range of about 26 to about 50%, the second extension bit is set to '01', when the ratio of the difference in value between the driving current of the first sub-pixel and the driving current of the second sub-pixel to the magnitude of the driving current that changes 1 grayscale value has a range of about 51 to about 75%, the second extension bit is set to '10', and when the ratio of the difference in value between the driving current of the first sub-pixel and the driving current of the second sub-pixel to the magnitude of the driving current that changes 1 grayscale value has a range of about 76 to about 100%, the second extension bit is set to '11'.

20. The method of claim 17, wherein the step of determining whether the input image data corresponds to the first sub-pixel or the second sub-pixel comprises determining whether a length of the first anode is shorter or longer than a length of the second anode based on an anode path register value.

21. The method of claim 20, wherein:

the anode path register value is 1 bit, the length of the first anode is set to be shorter than the length of the second anode when the anode path register value is '1', and the length of the first anode is set to be longer than the length of the second anode when the anode path register value is '0'.

22. The method of claim 17, wherein a length from one end to another end of the first anode is shorter than a length from one end to another end of the second anode.

* * * * *